United States Patent
Meyer et al.

(10) Patent No.: US 10,152,123 B2
(45) Date of Patent: Dec. 11, 2018

(54) METHOD AND SYSTEM FOR DETECTING OBJECTS OF INTEREST

(71) Applicant: 4TIITOO GMBH, Munich (DE)

(72) Inventors: Tore Meyer, Munich (DE); Stephan Odörfer, Munich (DE)

(73) Assignee: 4TIITOO GMBH, Munich (DE)

( * ) Notice: Subject to any disclaimer, the term of this patent is extended or adjusted under 35 U.S.C. 154(b) by 85 days.

(21) Appl. No.: 15/519,934

(22) PCT Filed: Oct. 28, 2015

(86) PCT No.: PCT/EP2015/074964
§ 371 (c)(1),
(2) Date: Apr. 18, 2017

(87) PCT Pub. No.: WO2016/066675
PCT Pub. Date: May 6, 2016

(65) Prior Publication Data
US 2017/0336865 A1    Nov. 23, 2017

(30) Foreign Application Priority Data

Oct. 30, 2014    (EP) .................................... 14191120

(51) Int. Cl.
*G06F 3/048*    (2013.01)
*G06F 3/0482*    (2013.01)
(Continued)

(52) U.S. Cl.
CPC ............ *G06F 3/013* (2013.01); *G06F 3/0482* (2013.01); *G06F 17/30247* (2013.01);
(Continued)

(58) Field of Classification Search
CPC ....................................................... G06F 3/013
See application file for complete search history.

(56) References Cited

U.S. PATENT DOCUMENTS

| 2007/0159601 A1* | 7/2007 | Ho | .......................... | G02C 7/02 |
| | | | | 351/221 |
| 2009/0024964 A1* | 1/2009 | Kantamneni | .......... | G06Q 30/02 |
| | | | | 715/854 |

(Continued)

FOREIGN PATENT DOCUMENTS

EP    2450803 A1    5/2012

OTHER PUBLICATIONS

International Search Report and Written Opinion for PCT/EP2015/074964 dated Nov. 16, 2015.

*Primary Examiner* — William L Bashore
*Assistant Examiner* — Rayeez R Chowdhury
(74) *Attorney, Agent, or Firm* — MH2 Technology Law Group LLP (57) ABSTRACT

A method for detecting objects (28) of interest comprises: receiving gaze tracking data (30) of a person looking at a collection of objects (28), the gaze tracking data (30) comprising information, at which points the person is looking; determining a map (42) of objects in the field of view of the person, the map (42) of objects indicating, at which position (44) an object in the collection of objects is arranged; determining gaze interaction events (48) for objects in the collection of objects by matching the gaze tracking data (30) to the map (42) of objects, wherein a gaze interaction event (48) for an object indicates that a specific gazing interaction has occurred with respect to the object; determining category characteristics (56) for at least those objects (28) having gaze interaction events (48), wherein a category characteristic (56) describes the object with respect to a specific object category (58); and determining at least one category characteristic (56) of interest in at least one object category (58) by finding at least one category characteristic (56) which is assigned to a plurality of objects (28), which (Continued)

have gaze interaction events (48) indicating the person is interested in these objects (28).

13 Claims, 3 Drawing Sheets (51) Int. Cl.
*G06F 3/01* (2006.01)
*G06F 17/30* (2006.01)

(52) U.S. Cl.
CPC .. *G06F 17/30256* (2013.01); *G06F 17/30268* (2013.01); *G06F 17/30274* (2013.01)

(56) References Cited

U.S. PATENT DOCUMENTS

| | | | |
|---|---|---|---|
| 2011/0128223 A1* | 6/2011 | Lashina | G06F 3/013 345/158 |
| 2011/0273369 A1* | 11/2011 | Imai | G06T 15/20 345/158 |
| 2012/0144312 A1 | 6/2012 | Miyamoto | |
| 2013/0050258 A1 | 2/2013 | Liu et al. | |

* cited by examiner

METHOD AND SYSTEM FOR DETECTING OBJECTS OF INTEREST

CROSS-REFERENCE TO RELATED APPLICATIONS

This application is a U.S. National Stage application of PCT/EP2015/074964 filed Oct. 28, 2015, which claims priority to European Application No. 14191120.6 filed Oct. 30, 2014, the disclosures of which are incorporated herein by reference in their entireties.

FIELD OF THE INVENTION

The invention relates to a method, a computer program and a computer-readable medium for detecting objects of interest with a gaze tracking system. Furthermore, the invention relates to a gaze tracking system.

BACKGROUND OF THE INVENTION

Devices like PCs, laptops, smartphones or head mounted eye trackers (such as augmented reality glasses, virtual reality glasses, eye tracking glasses or smart glasses) may be equipped with a gaze tracking system, which is adapted for determining the direction in which a person using the device is looking (eye tracking) and for determining, at which point the person is looking (gaze tracking).

A gaze tracking system may be used for supporting a search, which is a key activity when working with computers. However, optical searches of humans are usually happening both in the focus point as well as in the parafoveal, perifoveal and peripheral view, summarized in the following by the term peripheral view. When searching for a graphical distinguishable object (such as an image, a word, a text block, an icon, etc.), the focus point of human gaze is selectively directed to objects of interest it pre-identifies in the peripheral view based on optical recognizable aspects or object categories (e.g. dominant colours, structure, specific elements like people, text or graphics in images and icons, word length, arrangement of small, high rounded and straight letters in words) as potential candidates. The category characteristics which may be detected by a human in his peripheral view may depend on the search task itself and are generally limited by the capabilities of human vision in different areas of the peripheral view.

DESCRIPTION OF THE INVENTION

It is an object of the invention to support a computer-based search with a gaze tracking system in an efficient way.

This object is achieved by the subject-matter of the independent claims. Further exemplary embodiments are evident from the dependent claims and the following description.

An aspect of the invention relates to a method for detecting objects of interest, which completely may be performed by a computer. Objects of interests may be images and/or words displayed on a screen provided by a computer or may be real world objects, which for example are watched by a person through smart glasses or a head mounted eye tracker.

According to an embodiment of the invention, the method comprises: receiving gaze tracking data of a person looking at a collection of objects, the gaze tracking data comprising information, at which points the person is looking; determining a map of objects in the field of view of the person, the map of objects indicating, at which position an object in the collection of objects is arranged; determining (at least one type of) gaze interaction events for objects in the collection of objects by matching the gaze tracking data to the map of objects, wherein a gaze interaction event for an object indicates that a specific gazing interaction has occurred with respect to the object; determining category characteristics for objects having gaze interaction events, wherein a category characteristic describes the object with respect to a specific object category; and determining at least one category characteristic of interest in at least one object category by finding at least one category characteristic which is assigned to a plurality of objects, which have gaze interaction events indicating the person is interested in these objects.

For example, the gaze tracking data may comprise data points, which may comprise two coordinates, and which indicate a current focus point of one or two eyes of the person. To determine at which objects the person is looking, the map of objects may comprise the outlines or shapes of the objects. For example, the map of objects may comprise an outlining rectangle or in general an outlining polygon or outlining shape for each object in the collection of objects.

The data points of the gaze tracking data then may be mapped against the map of objects, for example by determining, which data points are positioned inside which outlines of the objects. Furthermore, gaze interaction events may be identified from the gaze tracking data, for example, by counting the number of gaze data points, which are positioned inside the respective outline of an object. It also may be possible to derive motion vectors from the data points (a vector having a support point and a direction), which give rise to further gaze interaction events, as, for example, predicted target points and/or a crossing of an object with a gaze vector.

At least for some of the objects, for which gaze interaction events have been identified, category characteristics are determined. For example, these category characteristics may be a specific color, a specific shape and/or a specific pattern in an image, when the objects are images or real world objects. Category characteristics may be assigned to object categories such as color, shape and/or a pattern. It has to be understood that only category characteristics of one or more special type of object categories may be considered (such as color and/or shape).

In the end, at least one category characteristic of interest in at least one object category is determined by combining the information determined during the previous steps, i.e. gaze interaction events assigned to objects and category characteristics assigned to objects. In general, by statistical evaluating the gathered information, one or more category characteristics are determined by finding one or more groups of similar category characteristics, which all are assigned to a plurality of objects, which are interesting for the person.

For example, the category characteristics of a specific category (such as color) may be represented by a single value (for example a specific color value) or a plurality of values (for example averaged color values spread over a grid, which is overlaying an image) and two category characteristics may be similar, when their value(s) differ from each other only at least by a threshold. A statistical function (such as least mean square), which is applied to (the value(s) of) a category characteristic may be used for determining a statistical value, which may be compared to a mean value for deciding, whether the category characteristic is in a specific group represented by the mean value.

In one case, an object may be declared interesting for a person, when the object is assigned to a gaze interaction event. As an example, a gaze interaction event indicates that the person is interested in an object, if the gaze interaction event is based on gaze tracking data having data points in a map area of the object. It also may be possible that a grade of interest or involvement level may be represented by a value that may be determined with a statistical function (for example dependent on gaze interaction events) and that an object is declared interesting, when its involvement level value is higher than a threshold value.

According to an embodiment of the invention, category characteristics of objects are clustered and the at least one category characteristic of interest is determined by selecting at least one cluster of category characteristics representing the at least one category characteristic of interest. The category characteristics may be clustered with respect to object categories and/or with respect to one or more mean category characteristics that may be determined with a statistical function. For example, in the category of average colors, the statistical function may find a cluster of blue average colors (which may comprise different blue color values) and a cluster of red average colors).

According to an embodiment of the invention, at least two different types of gaze interaction events are determined for an object. It has to be understood that from the pure gaze tracking data (i.e. data points), more complex gaze interaction events may be derived. For example, a gaze interaction event may be based on at least one of: gaze hits on the object, a duration of a gaze focus on the object, a fixation detection with respect to the object, a reading pattern detection with respect to the object, revisits of an object, detail scanning pattern, interaction time after a first appearance of an object on a display/in a peripheral view, a length of visit time, a time after finished loading of content, etc.

According to an embodiment of the invention, a gaze interaction event is based on a model of a peripheral view of the person. Usually, the gaze tracking data comprises data points which indicate the focus point of the gaze of the person. However, a person looking for specific characteristics during a search also uses his or her peripheral view for determining, which objects are interesting and which not. The peripheral view of a person may be defined as the view outside of the focus points or focus area.

In one case, a peripheral view may modeled with an area surrounding a focus point and excluding the focus point. The peripheral view may be modeled with one or more ring areas surrounding the focus point. An object, which map area overlaps with the peripheral view of a gaze interaction event, may be declared as interesting or as not interesting. A grade of interest value of an object may be based on a value assigned to such a gaze interaction event.

Gaze interaction events considering the peripheral view may be based on at least one of: a duration of the object in a peripheral view of the person, a level of involvement with the peripheral view of the person, outliers pointing at a specific object but that do not result in a focus point on the specific object, etc.

According to an embodiment of the invention, category characteristics for at least two different types of object categories are determined for an object. It has to be understood that not only one but two or more object categories are evaluated simultaneously for the objects of interest. It also may be possible that interesting object categories are determined during the evaluation of the gaze tracking data and that the determination of category characteristics is restricted to these object categories.

According to an embodiment of the invention, the category characteristics for the collection of objects are pre-calculated and stored together with the objects. For example, the objects may be stored in a database (such as images or videos) and the database also may contain category characteristics for a number of categories that have been calculated during or before the composition of the database. In the case of images and videos, for example, an average color value may be calculated and stored together with the respective multimedia data of the image or video.

According to an embodiment of the invention, the category characteristics are determined by evaluating object data of the objects. For example, the object data such as image data, video data or text data may be evaluated "on the fly", i.e. during or after the evaluation of the gaze tracking data, when it is displayed on a display device and/or during or after recording with a camera of the gaze tracking system.

According to an embodiment of the invention, object categories are determined by evaluating object data of objects from the group of interesting objects. It also may be possible that the object data is evaluated with a statistical method or with a machine learning method to generate object categories.

According to an embodiment of the invention, the method further comprises: determining an involvement level for an object from the gaze interaction events (and optionally the category characteristics) of the object, wherein only objects with an involvement level higher than an involvement level threshold are considered for the identification of interest, selection of objects and/or the selection of object categories. The involvement level may be a numerical value that is calculated based on the gaze interaction events. For example, different gaze interaction events (such as a fixation point or object being touched by a movement vector) may be assigned to different, for example predefined, involvement level values and the involvement level of an object is based on the involvement level values of the gaze interaction events (which, for example, may be multiplied or added).

Additionally, it may be possible that the involvement level may be based on common interests with other persons. For example, when a number of other users or persons find category characteristics a and b interesting, for a using finding characteristic a interesting, the involvement level for objects having characteristic b may be increased.

According to an embodiment of the invention, the method further comprises: determining a negative involvement level for an object from the gaze interaction events of the object (in particular based on a model of a peripheral view of the person) (and optionally the category characteristics of the object), wherein objects with a negative involvement level higher than a negative involvement level threshold are excluded for the selection of objects. The negative involvement level may be calculated analogously to the positive involvement level.

As an example, a person explicitly not looking at a specific object may have seen in his or her peripheral view that the object does not have the desired characteristic (because it may have the wrong color). In this case, the gaze interaction event "object touches peripheral view" without the gaze interaction event "focus" may result in a high negative involvement level.

The positive and negative involvement level thresholds may be predefined or dynamically determined. In the latter case, the values of the involvement level may be sorted and a cutoff may be determined where the curve of ascending or descending values has a steep flank (the derivative of the curve reaches a specific value). In general, the cutoff may be determined with any type of clustering.

According to an embodiment of the invention, the collection of objects is displayed on a display device in the field of view of the person. For example, the gaze tracking device monitors a person looking at the monitor of a computer, which displays the objects and also performs the method for detecting which objects, category characteristics and/or categories the person has interest in.

According to an embodiment of the invention, after the at least one category characteristic of interest has been determined, additional objects having the at least one characteristic of interest are displayed on the display device. In the case, the objects are displayed on a monitor of the display device, it also may be possible that the computer performing the method offers the person more objects that have the characteristics which seem to be interesting for the person.

According to an embodiment of the invention, the map of objects is generated from outlines of objects. In the case, the objects are displayed by the device, which also performs the method, outlines or shapes of the objects to be displayed may be determined and may be used for mapping the gaze tracking data to the objects. However, it also may be possible that the map of objects is generated from image data received from a camera recording the field of view of the person.

According to an embodiment of the invention, the collection of objects comprises at least one of: images, words, text blocks, icons, formulas, pages, sections of a document, 3D objects, shapes, patterns. All these types of objects may have different types of object categories, such as colors, shapes, word types, patterns, etc.

According to an embodiment of the invention, the object categories are visual descriptors, wherein the category characteristics are values of content descriptors. Several standards like the MPEP-7 standard defines standardized content descriptors, which associate values to characteristics of, for example, multimedia data. In the case of MPEP-7 examples for these descriptors are the Scalable Color Descriptor, the Color Layout Descriptor, the Dominant Colors Descriptor, and the Edge Histogram Descriptor.

Further aspects of the invention relate to a computer program for detecting objects of interest, which, when being executed by a processor, is adapted to carry out the steps of the method as described in the above and in the following, and to a computer-readable medium, in which such a computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a gaze tracking system, which, for example, may be provided by a laptop or by a head mounted eye tracker. It has to be understood that features of the method, the computer program and the computer-readable medium as described in the above and in the following may be features of the gaze tracking system as described in the above and in the following, and vice versa.

According to an embodiment of the invention, the gaze tracking system comprises a gaze tracking device for generating gaze tracking data and an object detection device, which may be adapted for performing the method as described in the above and in the following.

The gaze tracking device may comprise a light source for illuminating the eyes of a person and a camera or sensor for detecting the movement of the eyes. The gaze tracking device may generate gaze tracking data, for example a sequence of 2D data points, which indicate points a person is looking at.

The object detection device may be part of a computer, a smartphone, a tablet computer, or head mounted eye tracker for example attached to smart glasses. In general, the object detection device may be adapted for processing the gaze tracking data.

The gaze tracking system furthermore may comprise a display device for displaying the collection of objects, for examples images.

In summary, when working with a computer with gaze tracking and searching through a high number of objects (e.g. several hundreds to thousands of words, images), the information about focus point and peripheral vision may be used to identify similarities between the objects of interest. The information may support the user (i.e. person using the gaze tracking system) actively in her or his search by e.g. displaying a subsample containing the most probably search result for objects of the total number of objects, adapting the display order based on the assumed interest or, in a more indirect approach, using this information about similarities possibly combined with the information about the final selection to adapt the display of objects to other users making a selection in a similar group of objects after the search of the initial user.

The method may be used to identify objects or groups of objects of interest based on gaze data provided by a gaze tracking system (various setups from remote eye tracking to heads up displays with included eye trackers) to support the user in real time or near real time in optical based search processes.

While the movements of the focus point and several other aspects of the gaze interaction events (duration of the focus, distribution of the focus points, etc.) may reveal information about the objects of interest of the user, at the same time the focus point is attracted to objects based on personal interests reaching from repulsion over peculiarities, unfamiliarity and memories to attractiveness as well as object independent influences on the search process like being interrupted or idly gazing at the screen. These influences on the search process also may be compensated by the method.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

DETAILED DESCRIPTION OF EXEMPLARY EMBODIMENTS

Figure 1:
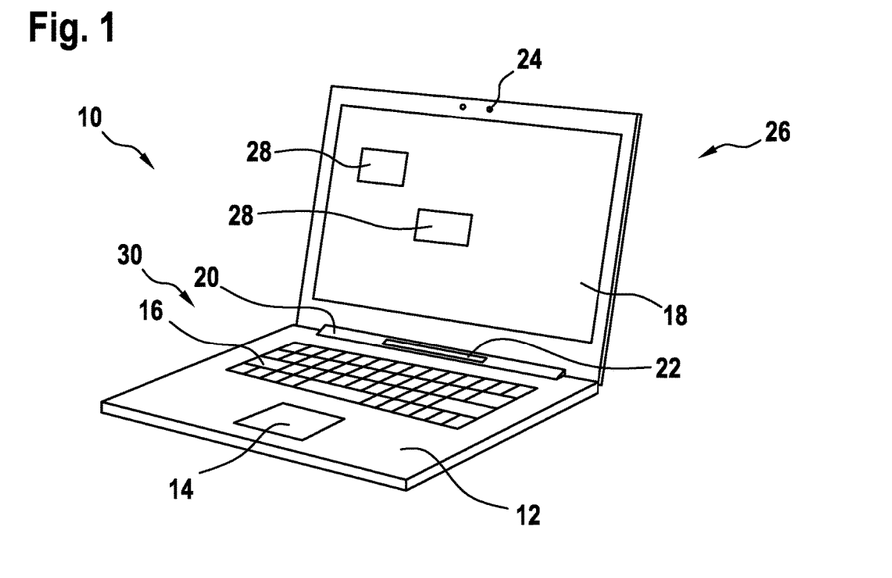
FIG. 1 shows a gaze tracking system according to an embodiment of the invention.

FIG. 1 shows a gaze tracking system 10 in the form of a laptop, which comprises a housing 12, a track pad 14 and a keyboard 16 attached to the housing 12, and a screen or display device 18, which is attached to the housing 12 via a hinge 20. On the hinge 20, a remote gaze tracker 22 for example comprising an infrared light source and corresponding sensors (a camera) is provided. Furthermore, a 3D camera 24 is provided above the screen 18.

With the remote gaze tracker 22 the laptop may be used as a gaze tracking device 26. Infrared light from the gaze tracker 22 is shone at the user and reflections from the eyeballs are recorded with an internal camera of the gaze tracker 22. From the recorded data of the infrared camera, the laptop 10 then predicts where the eyes are looking. In particular, the laptop 10 generates gaze tracking data, which may be provided to software components running in the laptop.

As will be explained in more detail below, the laptop 10 may display objects 28 and may use the gaze tracking data to detect, which objects 28 or which characteristics of the objects are interesting for the user. In this sense, the laptop 10 may be seen as an object detection device 30.

Figure 2:
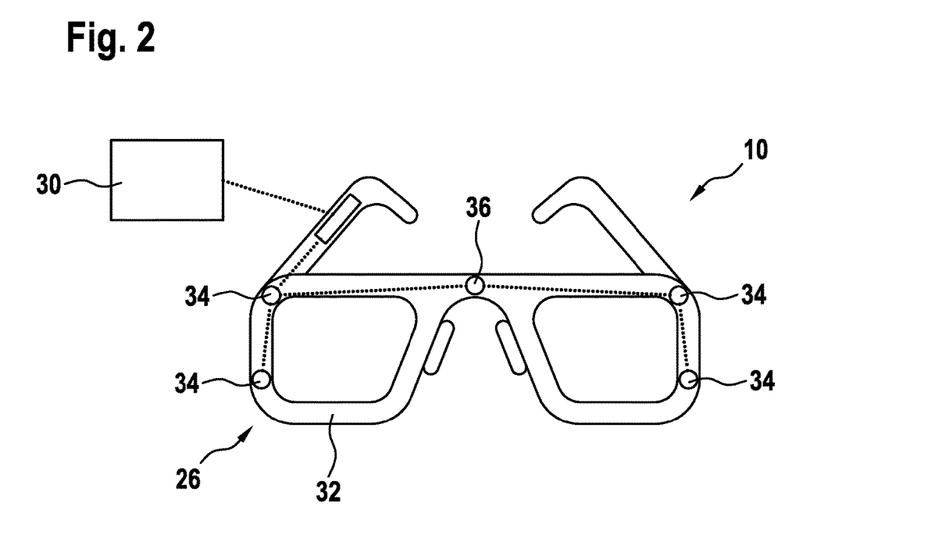
FIG. 2 shows a gaze tracking system according to a further embodiment of the invention.

FIG. 2 shows a further type of gaze tracking system 10 comprising glasses 32 as gaze tracking device 26 and an object detection device 30, which may be a PC or smartphone that is communicatively interconnected with the glasses 32. The glasses 32 comprise sensors or cameras 34 for recording the eyes of a wearer of the glasses 32 and the glasses 32 or the object detection device may generate gaze tracking data from the recorded data of the sensors 34.

The glasses 32 furthermore comprise a camera 36 for recording the field of view of the wearer. With the camera data of the camera 36, the object detection device 30 may detect objects the person is looking at (for example by finding outlines or shapes in the camera data) and with the gaze tracking data may detect, which objects or characteristics of these objects are interesting for the wearer.

Figure 3:
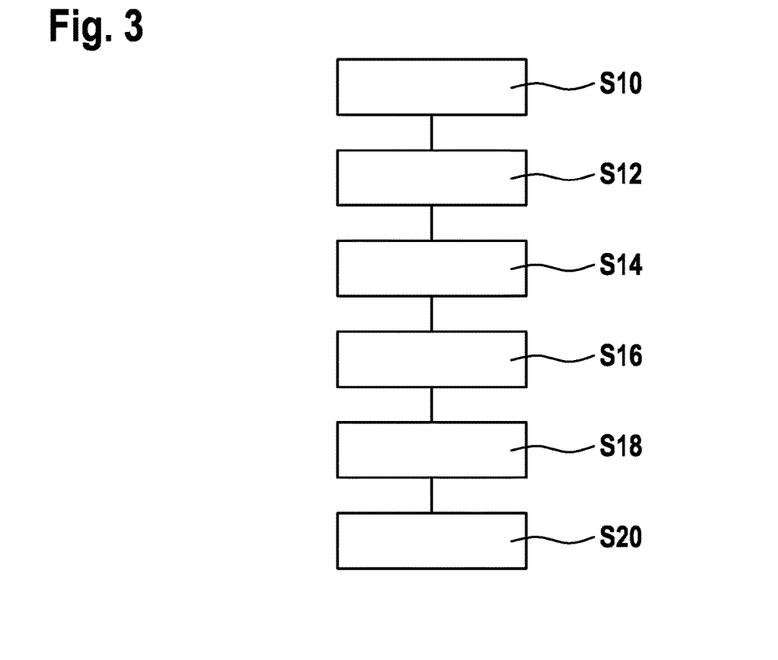
FIG. 3 shows a flow diagram for a method for detection of objects of interest according to an embodiment of the invention.

FIG. 3 shows a method for detecting objects of interest, which may be performed by the object detection device/module 30 of FIG. 1 or FIG. 2.

In step S10, the object detection device 30 receives gaze tracking data of a person looking at a collection of objects, the gaze tracking data comprising information, at which points the person is looking. For example, the collection of objects may be images on the display 18 or may be objects in her or his field of view, when wearing the glasses 32.

Figure 4:
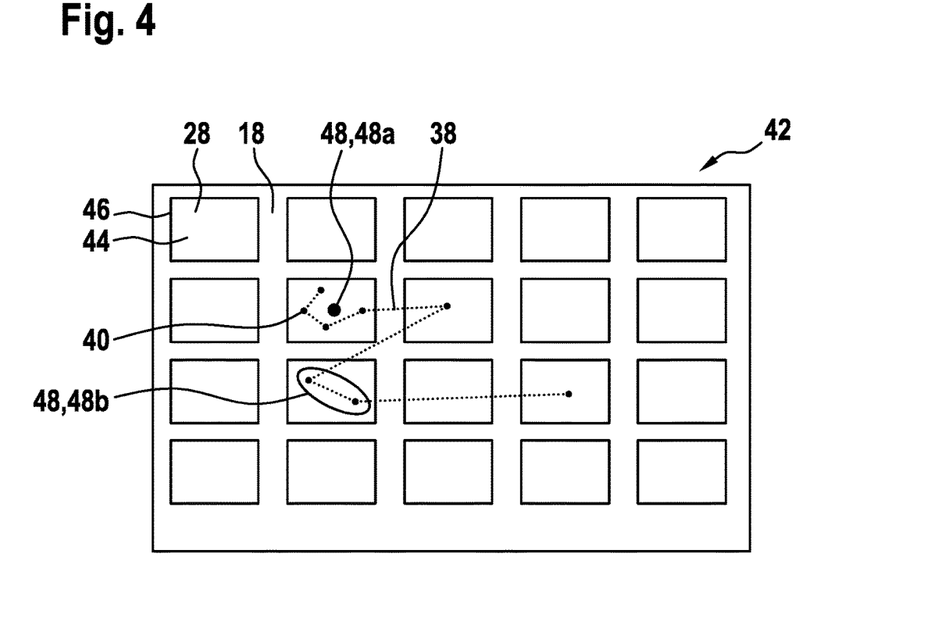
FIG. 4 schematically shows a map of objects used in the method of FIG. 3.

As shown in FIG. 4, the gaze tracking data 38 may comprise a sequence of data points 40 that, for example, may be recorded by the gaze tracking device 26 of FIG. 1 or FIG. 2 with a constant or variable sampling rate. The data points 40 may comprise two coordinates that may be mapped to the coordinates of the display 18 and/or a correction may be applied to adjust the assumed focus point.

In step S12, a map 42 of objects 28 in the field of view of the person is determined, the map 42 of objects indicating, at which position an object 28 in the collection of objects is arranged.

An example of such a map is also shown in FIG. 4. Each object 28 has a map area 44 in the map 42. In the case of FIG. 4, the map area 44 are equally sized rectangles. For example, the objects 28 may be equally sized images and the map area 44 may be the outer border of these images.

When the objects 28 have a more complicated form (for example, when the objects are part of an image), also outlines 46 may be determined for the objects 28 and the map 42 of objects may be generated from these outlines 46.

In the case, that the objects are real world objects (for example in the case of FIG. 2) and/or are not displayed by the gaze tracking system 10 itself, the map 42 of objects 28 may be generated from image data received from the camera 36. For example, an object recognition algorithm may be applied to the camera data and outlines of these objects are used for generating the map 42.

In step S14, gaze interaction events 48 are determined by matching the gaze tracking data to the map 42 of objects, wherein a gaze interaction event 48 for an object indicates that a specific gazing interaction has occurred with respect to the object 28. The gaze tracking data 30 is processed by one or more algorithms, which determine the gaze interaction events 48 from the gaze tracking data.

These algorithms may be neutrally with respect to a position of the objects 28 and the detected events 48 may have a position that may be mapped to one or more objects 28. An example for such a gaze interaction event 48 may be a fixation point 48a, which may be generated when a specific number of data points 40 is located within a specific area.

There also may be algorithms already focused on the objects 28. Examples for such algorithms are gaze hits 48b on the object 28 or a duration of gaze focus on the object 28.

Figure 5:
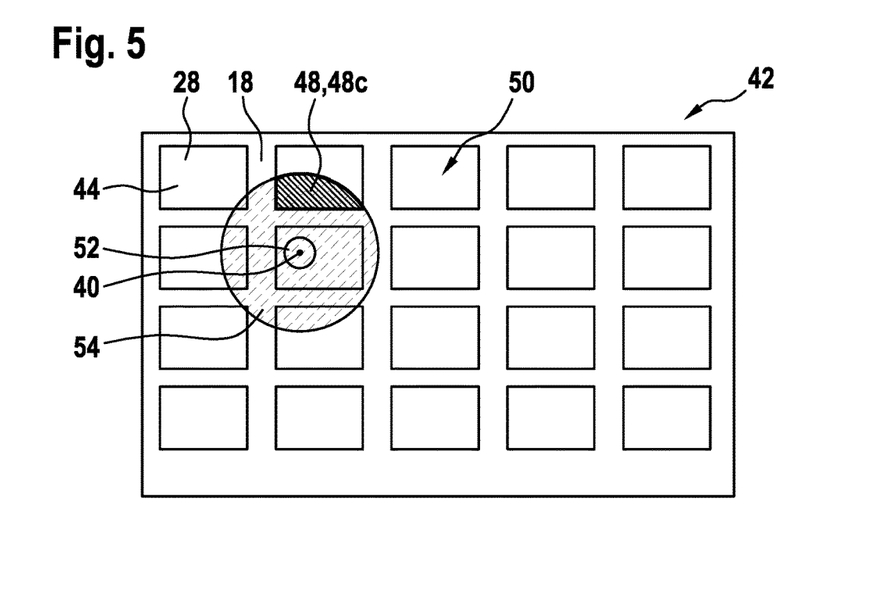
FIG. 5 schematically shows a model for a peripheral view used in the method of FIG. 3.

It also may be possible that a gaze interaction event 48, 48c is based on a model 50 of a peripheral view of the person as shown in FIG. 5. The event 48c may be described as the event "object only in peripheral view".

FIG. 5 shows a model 50 of the peripheral view comprising an inner circle around a data point 40 modeling the focus (foveal) view 52 of the person and an outer ring modeling the peripheral view 54 of the person. In FIG. 5 the peripheral view is modeled with an area surrounding the focus point and excluding the focus point.

Based on the model 50 (which also may comprise several concentric rings), the gaze tracking data on the peripheral view may be processed by several algorithms, which also may be neutrally with respect to position or which may be focused on the objects. Examples for such algorithms are a duration of an object 28 in the peripheral view, a level of involvement within the peripheral view, etc.

The model 50 may be adjusted to the person based on information about the person (for example based on monitored gaze/selection behavior). With respect to FIG. 5, the radii of the circle and the ring may be adapted to the person.

Figure 6:
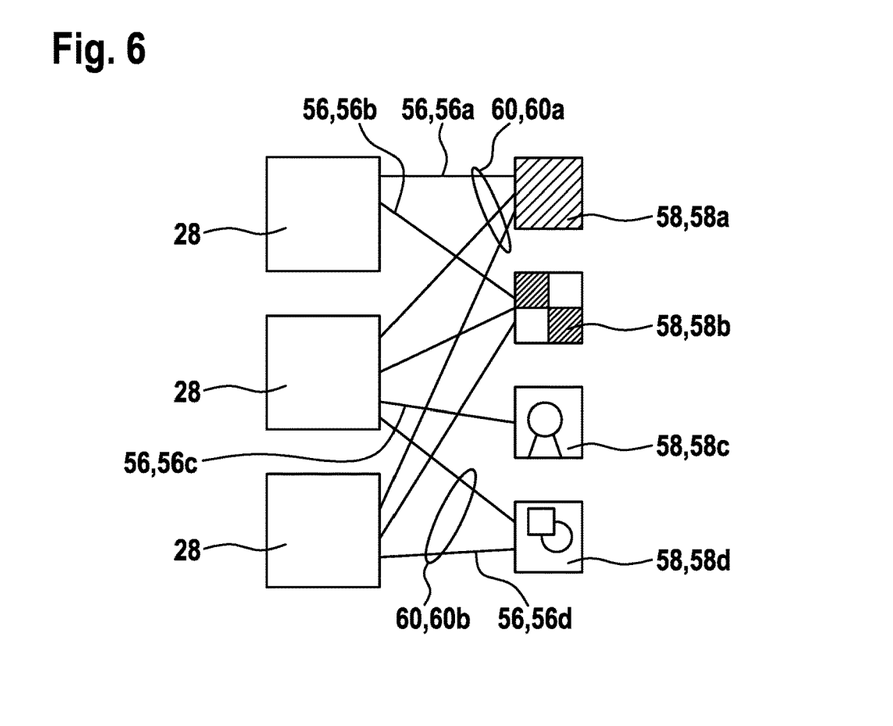
FIG. 6 schematically shows object categories and characteristics used in the method of FIG. 3.

In step S16, category characteristics for the objects 28 having gaze interaction events 38 are determined. As indicated in FIG. 6, every object 28 may have one or more category characteristics 56, which describe the object 28 with respect to a specific object category 58.

For example, the object categories 58 may be average color 58a, color pattern 58b, contains head 58c, shape 58d, etc. The characteristics 56 in these cases may be a color value 56a, a plurality of (color) values 56b, a Boolean value 58c and other data 58d like "circle", "square", "star").

It may be possible that the category characteristics 56 for the objects 26 are precalculated and stored together with the objects 26. For example, the characteristics 56 may be (standard) descriptors stored together with the objects in a database.

It also may be possible that the category characteristics 56 are determined by evaluating object data of the objects 26 on the fly. In the case, when relevant categories 58 are not known, upfront and/or aspects of similarities in known object categories 58 are built up during the search process. For example, the gaze tracking system 10 may know that the person is looking at images and considered object categories 58 for similarities in images are highlight colors, granularity, persons in image, etc., and these aspects are being analyzed in real time or near real time with respect to the objects 26 the user is looking at.

Additionally, it may be possible that even object categories 58 (not known before) are determined by evaluating object data of objects 26. In the case, when not even the object categories 58 for similarities are known, then similarities between BLOBs (binary large objects), i.e. the object data, may be analyzed based on machine learning algorithms, with or without taking into consideration, which kind of data is encoded into the object data.

In step S18, one or more category characteristics 56 of interest in one or more object categories 58 are determined by finding at least one category characteristic 56 which is assigned to a plurality of objects 28, which have gaze interaction events 48 indicating the person is interested in these objects.

The indicator, whether an object 28 is of interest for the person or not may be calculated based on a negative and/or positive involvement level, which may be a numerical value predicting the grade of interest or grade of disinterest with respect to an object.

Only objects 28 with an involvement level higher than an involvement level threshold are considered to be interesting objects and/or objects 28 with a negative involvement level higher than a negative involvement level threshold are excluded from the selection of interesting objects.

Here, the threshold or cutoff value for the positive and/or negative involvement level may dynamically be adjusted based on algorithms that detect clusters or steep drops in the curves of ordered involvement level over all objects 26.

For example, specific gaze interaction events 48 may have a predefined positive involvement level and/or may have a predefined negative involvement level, and the involvement levels of an object are then based on the gaze interaction event specific levels. For example, the involvement level of a fixation point 48*a* may be higher than that of number of hits 48*b*. A gaze interaction event 48*c* based on peripheral view may have a negative involvement level. For example, when an object 28 that was in a specific area 54 of the peripheral view during a time when the peripheral view was assumingly being processed actively but has not been focused afterwards.

After that, the category characteristics 56 of the interesting objects 28 are clustered and the at least one category characteristic of interest is determined by selecting at least one cluster of category characteristics representing the at least one category characteristic of interest. FIG. 6 shows two such clusters 60. For example, cluster 60*a* may be "objects being blue", wherein blue may be described by a range of color values that are perceived as blue. As a further example, cluster 60*b* may be "objects showing a circle".

As described above, category characteristics 56 of one object category 58 may be numerical, integer or Boolean values and/or may be collections/vectors/matrices of those values. These values or sets of values may be evaluated using statistical methods. For example, with least mean square a mean value may be determined for a specific category characteristic 56 and only those category characteristics 56 which have only a distance below a threshold may be taken into a cluster.

The category characteristics 56 may be clustered based on a single object category 58.

It may be possible that clustering takes place via several object categories 58. For example, the values (or sets of values) category characteristics 56 of several object categories 58 of one object 28 may be gathered into one vector or matrix and the vectors or matrices of interesting objects 28 may be evaluated for finding similar patterns. Such objects 28 with similar patterns may be clustered into one cluster. The category characteristic of interest may then be determined as representative of such a cluster. In this case, similarity may be defined that a statistical value that may be calculated from the vector or matrix only differs at least a threshold value from a mean value.

In general, it also may be possible that the clustering takes place based in the (positive and/or negative) involvement level in combination with the category characteristics, i.e. that vectors or matrices are formed from the involvement level and characteristics and the clustering is based on these vectors or matrices analogously as described above.

In the case, the collection of objects 28 is displayed on a display device 18 in the field of view of the person, in step S20, additional objects 28 having the at least one characteristic of interest may be displayed on the display device 18.

For example, when trends among category characteristics 56 of interest are detected, this information may be applied to the rest of the objects 28 being searched and/or further objects may be pulled from a database of similar objects 28 that is accessible by the gaze tracking system 10.

When having a history of the user, information about the prior familiarity with a subset of the objects and/or when having some additional information on the objects, this information also may be used in the search process. For example, images in a certain date range when sorted by date may be ignored and/or the system 10 may know a group of images in detail and is not including these because it knows the searched item is not included.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 gaze tracking system
12 housing
14 track pad
16 keyboard
18 display device
20 hinge
22 gaze tracker 24 3D camera
26 gaze tracking device
28 object
30 object detection device
32 head mounted eye tracking system
34 eye tracking sensor
36 camera
38 gaze tracking data
40 data point
42 map of objects
44 map area
46 outline
48 gaze interaction event
50 model of peripheral view
52 focus view
54 peripheral view
56 category characteristic
58 object category
60 cluster

The invention claimed is:

1. A method for detecting objects of interest, the method comprising:
receiving gaze tracking data of a person looking at a collection of objects, the gaze tracking data comprising information, at which points the person is looking;
determining a map of objects in the field of view of the person, the map of objects indicating, at which position an object in the collection of objects is arranged;
determining gaze interaction events for objects in the collection of objects by matching the gaze tracking data to the map of objects, wherein a gaze interaction event for an object indicates that a specific gazing interaction has occurred with respect to the object and wherein a gaze interaction event is based on a model of a peripheral view of the person;
determining category characteristics for objects having gaze interaction events, wherein a category characteristic describes the object with respect to a specific object category;
determining at least one category characteristic of interest in at least one object category by finding at least one category characteristic which is assigned to a plurality of objects, which have gaze interaction events indicating the person is interested in these objects
determining a negative involvement level for an object from the gaze interaction events of the object based on the model of the peripheral view of the person, wherein objects with a negative involvement level higher than a negative involvement level threshold are excluded for a selection of objects.

2. The method of claim 1, wherein category characteristics of objects are clustered and the at least one category characteristic of interest is determined by selecting at least one cluster of category characteristics representing the at least one category characteristic of interest.

3. The method of claim 1, wherein at least two different types of gaze interaction events are determined for an object.

4. The method of claim 1 wherein the peripheral view is modeled with an area surrounding a focus point and excluding the focus point.

5. The method of claim 1, wherein category characteristics for at least two different types of object categories are determined for an object.

6. The method of claim 1, wherein:
the category characteristics for the collection of objects are precalculated and stored together with the objects; and/or wherein the category characteristics are determined by evaluating object data of the objects.

7. The method of claim 1, wherein object categories are determined by evaluating object data of objects from the group of interesting objects.

8. The method of claim 1, further comprising:
determining an involvement level for an object from the gaze interaction events of the object, wherein only objects with an involvement level higher than an involvement level threshold are considered for the selection of objects.

9. The method of claim 1, wherein:
the collection of objects is displayed on a display device in the field of view of the person; and/or
after the at least one category characteristic of interest has been determined, additional objects having the at least one characteristic of interest are displayed on the display device.

10. The method of claim 1, wherein:
the map of objects is generated from outlines of objects; and/or
the map of objects is generated from image data received from a camera recording the field of view of the person.

11. The method of claim 1, wherein:
the collection of objects comprises at least one of: images, words, text blocks, icons, formulas, pages, sections of a document, 3D objects, shapes, patterns; and/or
the object categories are content descriptors; and/or
the category characteristics are values of content descriptors.

12. A non-transitory computer-readable medium, in which a computer program for detecting objects of interest is stored, which, when being executed by a processor, is adapted to carry out the steps of: receiving gaze tracking data of a person looking at a collection of objects, the gaze tracking data comprising information, at which points the person is looking; determining a map of objects in the field of view of the person, the map of objects indicating, at which position an object in the collection of objects is arranged; determining gaze interaction events for objects in the collection of objects by matching the gaze tracking data to the map of objects, wherein a gaze interaction event for an object indicates that a specific gazing interaction has occurred with respect to the object and wherein a gaze interaction event is based on a model of a peripheral view of the person; determining category characteristics for objects having gaze interaction events, wherein a category characteristic describes the object with respect to a specific object category; determining at least one category characteristic of interest in at least one object category by finding at least one category characteristic which is assigned to a plurality of objects, which have gaze interaction events indicating the person is interested in these objects; determining a negative involvement level for an object from the gaze interaction events of the object based on the model of the peripheral view of the person, wherein objects with a negative involvement level higher than a negative involvement level threshold are excluded for a selection of objects.

13. A gaze tracking system, comprising:
a gaze tracking device for generating gaze tracking data; and
an object detection device adapted for performing the steps of:
receiving gaze tracking data of a person looking at a collection of objects, the gaze tracking data comprising information, at which points the person is looking;

determining a map of objects in the field of view of the person, the map of objects indicating, at which position an object in the collection of objects is arranged;

determining gaze interaction events for objects in the collection of objects by matching the gaze tracking data to the map of objects, wherein a gaze interaction event for an object indicates that a specific gazing interaction has occurred with respect to the object and wherein a gaze interaction event is based on a model of a peripheral view of the person;

determining category characteristics for objects having gaze interaction events, wherein a category characteristic describes the object with respect to a specific object category;

determining at least one category characteristic of interest in at least one object category by finding at least one category characteristic which is assigned to a plurality of objects, which have gaze interaction events indicating the person is interested in these objects;

determining a negative involvement level for an object from the gaze interaction events of the object based on the model of the peripheral view of the person, wherein objects with a negative involvement level higher than a negative involvement level threshold are excluded for a selection of objects.

* * * * *